(12) United States Patent
Cheng et al.

(10) Patent No.: US 12,025,075 B2
(45) Date of Patent: Jul. 2, 2024

(54) CRYOGENIC ENGINE FOR SPACE APPARATUS

(71) Applicant: SHANGHAI INSTITUTE OF SPACE PROPULSION, Shanghai (CN)

(72) Inventors: Cheng Cheng, Shanghai (CN); Haiqing Zhou, Shanghai (CN); Gui Tian, Shanghai (CN); Jingyu Xiong, Shanghai (CN); Yeming Zeng, Shanghai (CN); Guofeng Zhou, Shanghai (CN); Hongbo Xu, Shanghai (CN)

(73) Assignee: SHANGHAI INSTITUTE OF SPACE PROPULSION, Shanghai (CN)

( * ) Notice: Subject to any disclaimer, the term of this patent is extended or adjusted under 35 U.S.C. 154(b) by 0 days.

(21) Appl. No.: 18/026,601

(22) PCT Filed: Sep. 13, 2021

(86) PCT No.: PCT/CN2021/117908
§ 371 (c)(1),
(2) Date: Mar. 16, 2023

(87) PCT Pub. No.: WO2022/057752
PCT Pub. Date: Mar. 24, 2022

(65) Prior Publication Data
US 2023/0332561 A1    Oct. 19, 2023

(30) Foreign Application Priority Data
Sep. 16, 2020  (CN) .......................... 202010972925.8

(51) Int. Cl.
| | |
|---|---|
| *F02K 9/52* | (2006.01) |
| *B64G 1/40* | (2006.01) |
| *F02K 9/44* | (2006.01) |
| *F02K 9/95* | (2006.01) |

(52) U.S. Cl.
CPC ................ *F02K 9/44* (2013.01); *B64G 1/401* (2013.01); *B64G 1/402* (2013.01); *F02K 9/52* (2013.01); *F02K 9/95* (2013.01)

(58) Field of Classification Search
CPC ................ F02K 9/44; F02K 9/52; F02K 9/95
See application file for complete search history.

(56) References Cited

U.S. PATENT DOCUMENTS

| | | | | |
|---|---|---|---|---|
| 710,130 | A * | 9/1902 | Weiss ........................ | F02K 9/50 261/76 |
| 2,695,496 | A * | 11/1954 | Goddard ................... | F02K 9/52 60/260 |

(Continued)

FOREIGN PATENT DOCUMENTS

CN    109595097 A  *  4/2019   ............... F02K 9/56

OTHER PUBLICATIONS

Mishra, D. P .. (2017). Fundamentals of Rocket Propulsion. (pp. 337-350). Taylor & Francis. Retrieved from https://app.knovel.com/hotlink/toc/id:kpFRP00015/fundamentals-rocket-propulsion/fundamentals-rocket-propulsion (Year: 2017).*

*Primary Examiner* — Todd E Manahan
*Assistant Examiner* — Marc J Amar
(74) *Attorney, Agent, or Firm* — Bayramoglu Law Offices LLC

(57) ABSTRACT

A cryogenic engine for a space apparatus is provided. The cryogenic engine includes an injector body, a thrust chamber, and a spark plug, where the injector body is provided therein with an accommodating space; the spark plug is provided on one side of the injector body, and an electrode provided on the spark plug extends into the accommodating space; the thrust chamber is provided on the other side of the injector body and is communicated with the accommodating space; the injector body is provided with a combustion improver flow channel and a combustible agent flow chan- (Continued)

nel; and the combustion improver flow channel and combustible agent flow channel are connected with the accommodating space.

6 Claims, 3 Drawing Sheets

(56) References Cited

U.S. PATENT DOCUMENTS

| | | | | |
|---|---|---|---|---|
| 2,749,706 | A * | 6/1956 | Goddard | F02K 9/64 60/39.461 |
| 3,057,159 | A * | 10/1962 | Benedict | F02K 9/95 313/120 |
| 3,059,429 | A * | 10/1962 | Bjerklie | F02K 9/68 431/259 |
| 3,106,059 | A * | 10/1963 | Ledwith | F02K 9/52 60/39.821 |
| 3,640,072 | A * | 2/1972 | Kayser | F02K 9/64 60/265 |
| 4,840,025 | A * | 6/1989 | Coffinberry | F02K 9/64 102/289 |
| 6,469,424 | B1 * | 10/2002 | Marable | F02K 9/95 313/231.01 |
| 2009/0173321 | A1 * | 7/2009 | Horn | F02P 15/003 123/642 |
| 2013/0074472 | A1 * | 3/2013 | Jensen | F02K 9/52 60/200.1 |
| 2018/0187631 | A1 * | 7/2018 | Roz | F02K 9/64 |

\* cited by examiner

CRYOGENIC ENGINE FOR SPACE APPARATUS

CROSS REFERENCE TO THE RELATED APPLICATIONS

This application is the national phase entry of International Application No. PCT/CN2021/117908, filed on Sep. 13, 2021, which is based upon and claims priority to Chinese Patent Application No. 202010972925.8, filed on Sep. 16, 2020, the entire contents of which are incorporated herein by reference.

TECHNICAL FIELD

The present disclosure relates to the technical field of rocket engines, and in particular to a cryogenic engine for a space apparatus.

BACKGROUND

High-performance, non-toxic cryogenic chemical propulsion technology has become the mainstream development direction of liquid-propellant rocket engines. Rocket engines and rocket propulsion systems based on cryogenic propellant combinations such as liquid oxygen/methane and liquid oxygen/liquid hydrogen have broad application prospects in the fields of launch vehicles, space vehicles, and the construction of planetary bases due to their high comprehensive performance (specific impulse performance, reusability, operation and maintenance performance, and long-term storage in space, etc.). However, unlike conventional engines based on the propellant combination of nitrogen tetroxide/hydrazine, engines based on cryogenic bi-component non-self-igniting propellant combinations such as liquid oxygen/methane need a special ignition structure to achieve the operation of the engines. Therefore, ignition technology has become one of the key technologies for the reliable operation of the liquid oxygen/methane engine. In particular, the low-thrust cryogenic attitude control engine applied in space has special requirements such as tens of thousands of pulse ignition and long service life, which puts forward higher requirements for the ignition reliability and thermal structure safety of the engine.

Chinese patent application CN108321678B discloses a pre-combustion chamber ignition structure, a pre-combustion chamber ignition system, and a working method thereof. A central electrode extends into the pre-combustion chamber, and an end of the central electrode is provided with a grounding electrode. A spark plug gap is formed between the central electrode and the grounding electrode in the pre-combustion chamber. In this design, the electrode is easy to be ablated, reducing the reliability of the equipment.

SUMMARY

In view of the defects in the prior art, an objective of the present disclosure is to provide a cryogenic engine for a space apparatus.

The cryogenic engine for a space apparatus includes an injector body, a thrust chamber, and a spark plug, where
the injector body is provided therein with an accommodating space; and the spark plug is provided on one side of the injector body, and an electrode provided on the spark plug extends into the accommodating space;
the thrust chamber is provided on the other side of the injector body and is communicated with the accommodating space; and
the injector body is provided with a combustion improver flow channel and a combustible agent flow channel; and the combustion improver flow channel and combustible agent flow channel are connected with the accommodating space.

Preferably, the cryogenic engine for a space apparatus further includes a first valve and a second valve, where
the first valve is provided on the combustion improver flow channel, and the second valve is provided on the combustible agent flow channel.

Preferably, the combustion improver flow channel is connected with the accommodating space through a like-impinging primary injector element.

Preferably, the like-impinging primary injector element includes multiple first orifices; each two first orifices form a like-impinging pair, and there are 2-8 like-impinging pairs; the first orifices each have a length-diameter ratio of 2-4; and the like-impinging pairs each have an impingement angle of 60-90°.

Preferably, an inner wall of the injector body is provided with an inner convex cathode; the inner convex cathode divides the accommodating space into an atomization and vaporization chamber and a combustion chamber; a gap at one end of the electrode along an extension direction is provided in the inner convex cathode; the gap forms an annular secondary injector element; and the annular secondary injector element communicates the atomization and vaporization chamber with the combustion chamber.

Preferably, the combustible agent flow channel extends to form a first sub-channel and a second sub-channel; the first sub-channel is connected with the accommodating space through an inclined core injector element; and the second sub-channel is connected with the accommodating space through a swirl injector element.

Preferably, the like-impinging primary injector element is provided with a vaporization baffle towards the accommodating space; and the vaporization baffle is connected with the injector body.

Preferably, the inclined core injector element is connected with the combustion chamber; and an orientation of the inclined core injector element forms an angle of 0-90° with an orientation of the annular secondary injector element.

Preferably, the inclined core injector element includes multiple second orifices; the second orifices each have a length-diameter ratio of 2-4, and each two adjacent second orifices have an impingement angle of 60-90°; and a height between an end surface of an extended end of the electrode and an impingement point along an axis of the electrode is 3-5 mm.

Preferably, the swirl injector element includes multiple third orifices; the multiple third orifices are uniformly arranged along a circumferential direction of the combustion chamber, and are oriented in a tangential direction of the circumferential direction of the combustion chamber; and the third orifices each have a length-diameter ratio of 2-4.

Compared with the prior art, the present disclosure has the following advantages.

1. The present disclosure adopts the structural design of the combination of the inclined core injector element and the swirl injector element, and independently controls a mixing ratio of an ignition core zone and a total mixing ratio of the engine through staged combustion, so as to ensure the ignition reliability and thermal structure safety of the engine. The present disclosure has the advantage of unlimited spark ignition times and can meet the special requirements of attitude control engines for thousands of pulse ignition and long service life for space application.

2. The present disclosure adopts the structural design of the like-impinging primary injector element and the atomization and vaporization chamber. The liquid oxygen is fully vaporized into gas oxygen after atomization by the primary injector element, and the gas oxygen enters the ignition core zone through the annular secondary injector element. The gas oxygen is easy to be broken down and ionized in the ignition process, thus improving the ignition reliability of the engine. The gas oxygen can also form a uniform oxygen film during the steady operation of the engine to make the downstream combustion more stable.

3. The present disclosure adopts the structure design of the annular secondary injector element and the inclined core methane injector element. The present disclosure can continuously generate multiple pure oxygen plasma flows during the ignition process to further improve the ignition reliability of the engine. The present disclosure can effectively eliminate the potential ablation of the electrode during the steady operation, thereby extending the service life of the engine.

4. The present disclosure adopts the structure design of the swirl injector element 24, and can form a uniform film on the inner wall of the thrust chamber for cooling to ensure the thermal structure safety of the engine.

5. The present disclosure is applicable to low-thrust liquid oxygen/methane attitude control engines and low-thrust rocket engines based on a cryogenic bi-component non-self-igniting propellant combination such as liquid oxygen/liquid hydrogen or liquid oxygen/kerosene. The present disclosure has a wide range of applications and improves the practicability of the equipment.

BRIEF DESCRIPTION OF THE DRAWINGS

Other features, objectives, and advantages of the present disclosure will become more apparent by reading the detailed description of non-limiting embodiments with reference to the following accompanying drawings.

Figure 1:
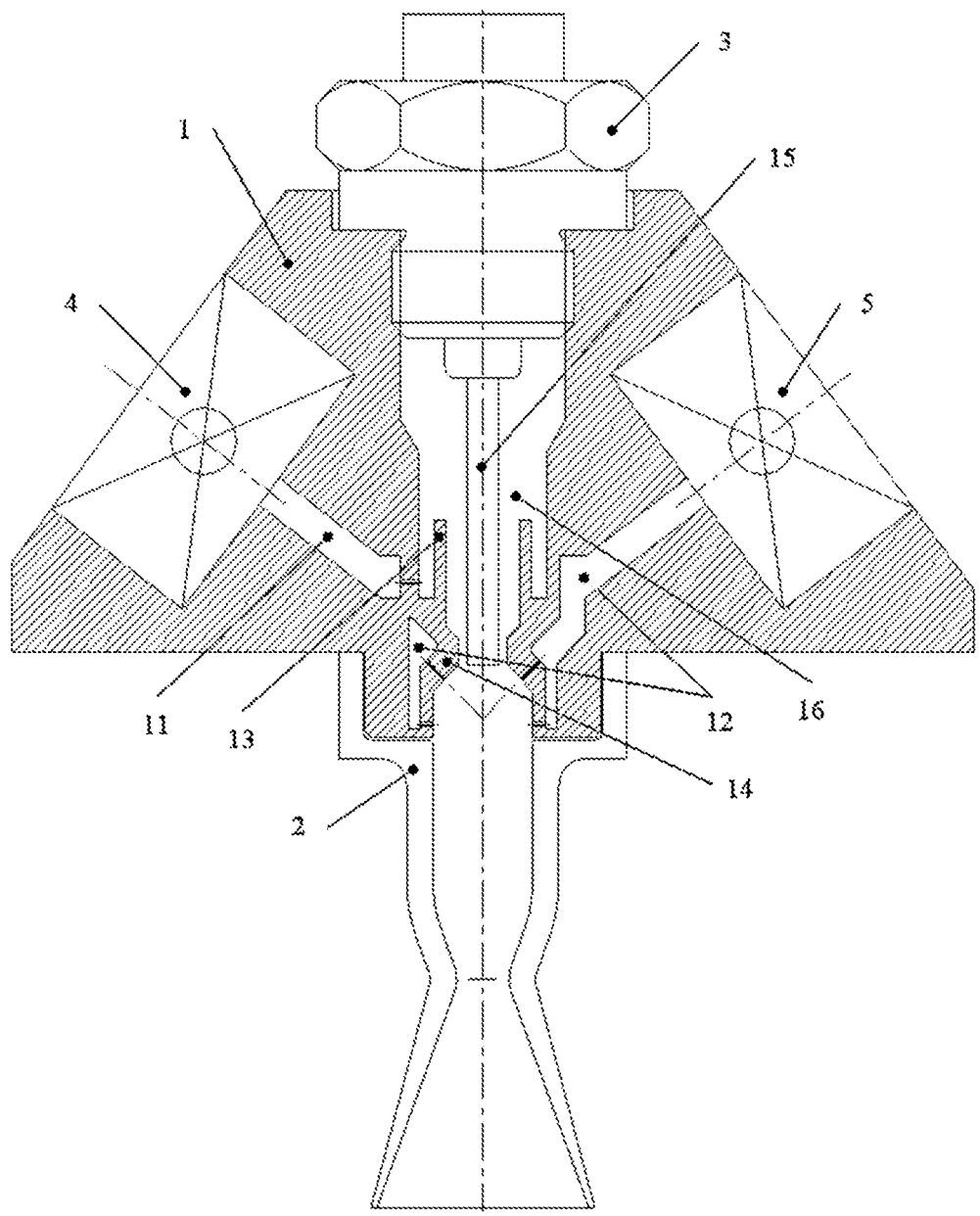
FIG. 1 is a structural diagram of a cryogenic engine for a space apparatus according to an embodiment of the present disclosure.

| Reference Numerals: | |
| --- | --- |
| 1. | injector body; |
| 2. | thrust chamber; |
| 3. | spark plug; |
| 4. | first valve; |
| 5. | second valve; |

| Reference Numerals: | |
| --- | --- |
| 11. | combustion improver flow channel; |
| 12. | combustible agent flow channel; |
| 13. | vaporization baffle; |
| 14. | inner convex cathode; |
| 15. | electrode; |
| 16. | atomization and vaporization chamber; |
| 21. | like-impinging primary injector element; |
| 22. | annular secondary injector element; |
| 23. | inclined core injector element; |
| 24. | swirl injector element; |
| 25. | combustion chamber. |

DETAILED DESCRIPTION OF THE EMBODIMENTS

The present disclosure is described in detail below with reference to specific embodiments. The following embodiments will help those skilled in the art further understand the present disclosure, but will not limit the present disclosure in any way. It should be noted that several variations and improvements can also be made by a person of ordinary skill in the art without departing from the conception of the present disclosure. These all fall within the protection scope of the present disclosure.

The present disclosure provides a cryogenic engine for a space apparatus. As shown in FIGS. 1 to 5, the cryogenic engine includes injector body 1, thrust chamber 2, and spark plug 3. The injector body 1 is provided therein with an accommodating space. The spark plug 3 is provided on one side of the injector body 1, and electrode 15 provided on the spark plug 3 extends into the accommodating space. The thrust chamber 2 is provided on the other side of the injector body 1 and is communicated with the accommodating space. The spark plug 3 is preferably arranged on the injector body 1 through a thread. The thrust chamber 2 may be provided on the injector body 1 through welding, screw connection or a flange. The injector body 1 is provided with combustion improver flow channel 11 and combustible agent flow channel 12. The combustion improver flow channel 11 and combustible agent flow channel 12 are connected with the accommodating space. In the present disclosure, liquid oxygen is used as a combustion improver; and methane, liquid hydrogen or kerosene, etc. is used as a combustible agent.

It should be noted that the cryogenic engine in the present disclosure refers to an engine with atomization and vaporization chamber 16 suitable for a cryogenic propellant, where a liquid temperature range of liquid oxygen/liquid methane is 90-110 K.

Specifically, as shown in FIG. 1, in the present disclosure, the cryogenic engine further includes first valve 4 and second valve 5. The first valve 4 is provided on the combustion improver flow channel 11, and the second valve 5 is provided on the combustible agent flow channel 12. The first valve 4 and the second valve 5 are preferably embedded in the injector body 1. The combustion improver flow channel 11 and the combustible agent flow channel 12 each are provided with a liquid accumulation chamber.

Specifically, as shown in FIG. 1, the combustion improver flow channel 11 is connected with the accommodating space through like-impinging primary injector elements 21. The like-impinging primary injector elements 21 each include multiple first orifices. Each two first orifices form a like-impinging pair. There are 2-8 like-impinging pairs. The first orifices each have a length-diameter ratio of 2-4. The like-impinging pairs each have an impingement angle of 60-90°. The impingement angle refers to an angle formed by spraying direction of the two first orifices in the like-impinging pair. In a preferred embodiment, in the schematic diagram of the like-impinging primary injector elements 21 arranged on the combustion improver flow channel 11, multiple like-impinging primary injector elements 21 are arranged along a circumferential direction of the atomization and vaporization chamber 16, greatly improving the vaporization efficiency of liquid oxygen.

Specifically, as shown in FIG. 1, an inner wall of the injector body 1 is provided with inner convex cathode 14. The inner convex cathode 14 divides the accommodating space into the atomization and vaporization chamber 16 and combustion chamber 25. A gap at one end of the electrode 15 along an extension direction is provided in the inner convex cathode 14. The gap forms annular secondary injector element 22. The annular secondary injector element 22 communicates the atomization and vaporization chamber 16 with the combustion chamber 25.

Figure 2:
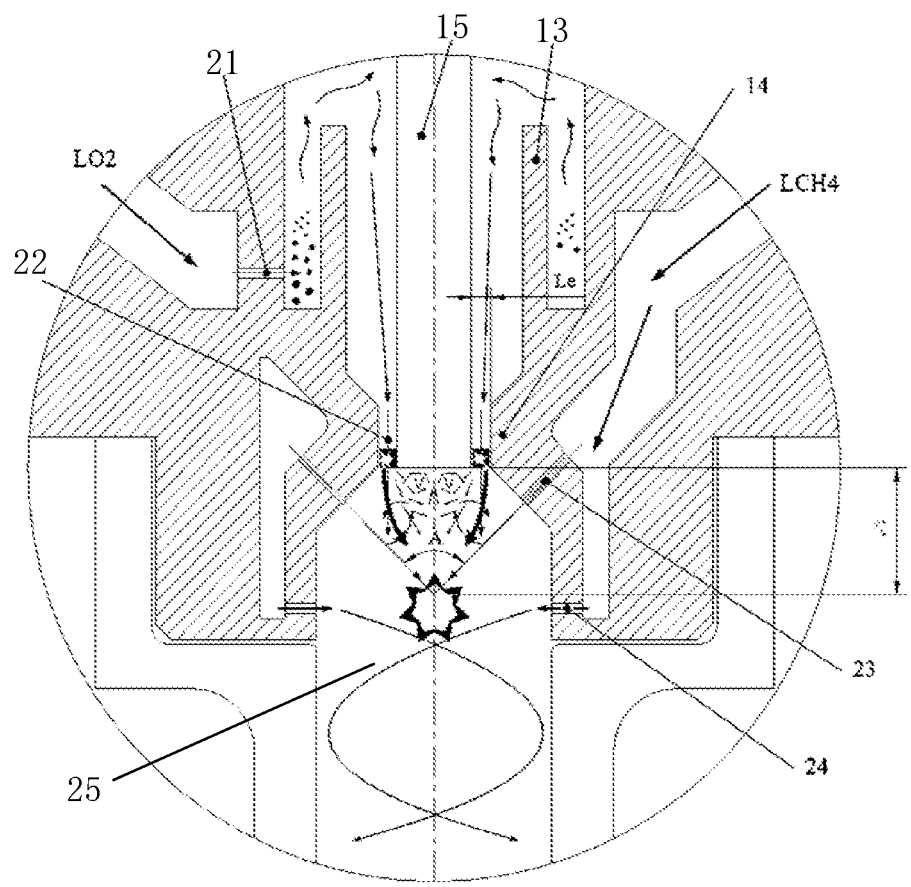
FIG. 2 is a schematic diagram of the cryogenic engine for a space apparatus according to an embodiment of the present disclosure.
Figure 3:
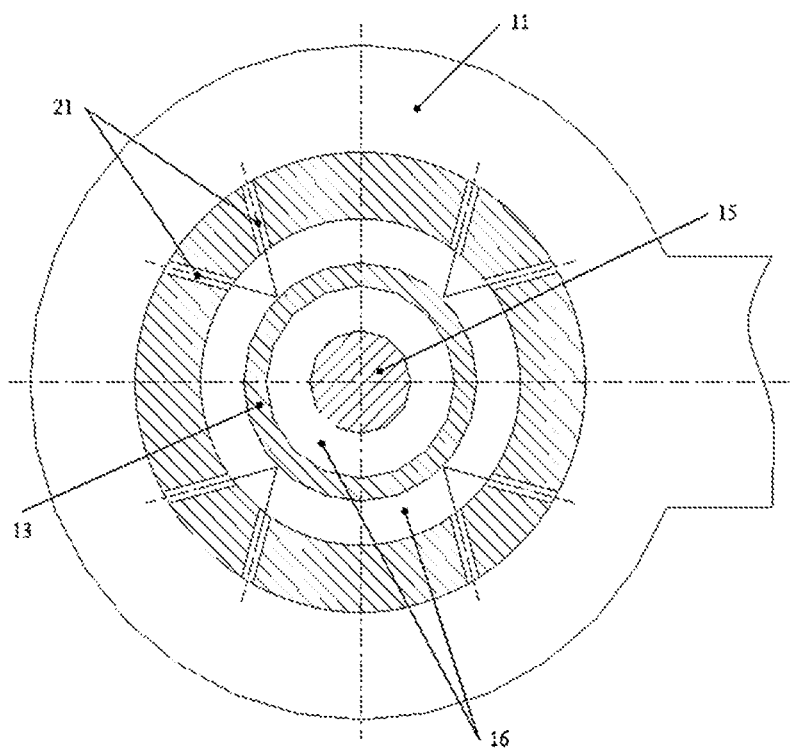
FIG. 3 is a structural diagram of a like-impinging primary injector element according to an embodiment of the present disclosure.
Figure 4:
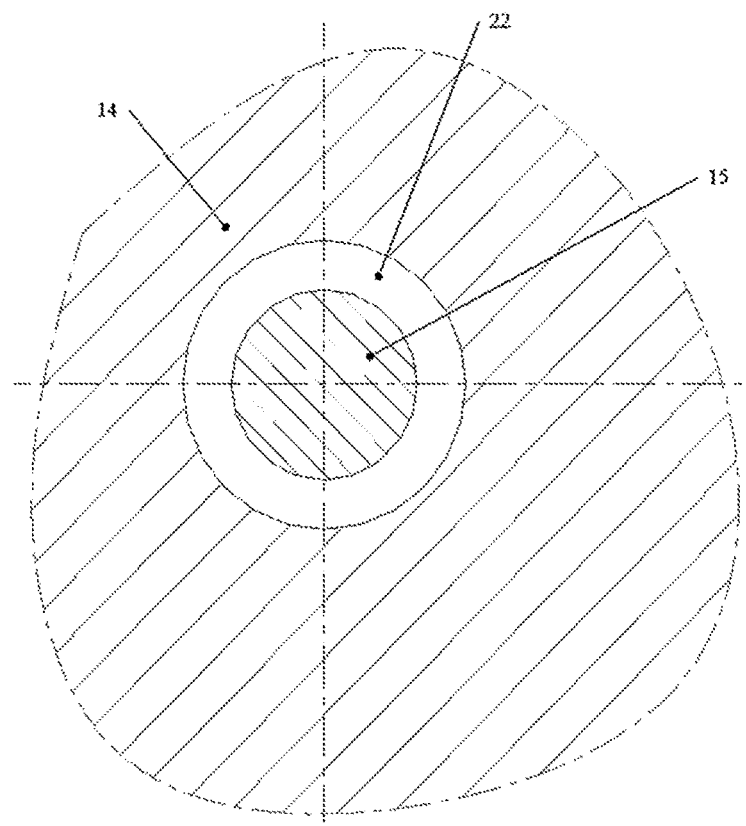
FIG. 4 is a structural diagram of an annular secondary injector element according to an embodiment of the present disclosure.

Specifically, as shown in FIG. 1, the combustible agent flow channel 12 extends to form a first sub-channel and a second sub-channel. The first sub-channel is connected with the accommodating space through inclined core injector element 23, and the second sub-channel is connected with the accommodating space through swirl injector elements 24. The inclined core injector elements 23 are connected with the combustion chamber 25. An orientation of each of the inclined core injector elements 23 forms an angle of 0-90° with an orientation of the annular secondary injector element 22. There are multiple inclined core injector elements 23 and multiple swirl injector elements 24 arranged along a circumferential direction of the combustion chamber 25. Preferably, the inclined core injector elements 23 and the swirl injector elements 24 are uniformly arranged along the circumferential direction of the combustion chamber 25. FIG. 2 shows that the first sub-channel and the second sub-channel are arranged on the combustible agent flow channel 12 and are respectively matched with the inclined core injector elements 23 and the swirl injector elements 24.

Specifically, as shown in FIG. 1, in a preferred embodiment, the inclined core injector elements 23 each include multiple second orifices. The second orifices each have a length-diameter ratio of 2-4, and each two adjacent second orifices have an impingement angle A of 60-90°. As shown in FIG. 2, a height between an end surface of an extended end of the electrode 15 and an impingement point along an axis of the electrode 15 is 3-5 mm. A height of the impingement point is denoted as Lc. Through the design of the height of the impingement point, a tip of the electrode 15 avoids a core high-temperature combustion zone so as to effectively reduce the heat transfer of a high-temperature gas to the electrode 15.

Figure 5:
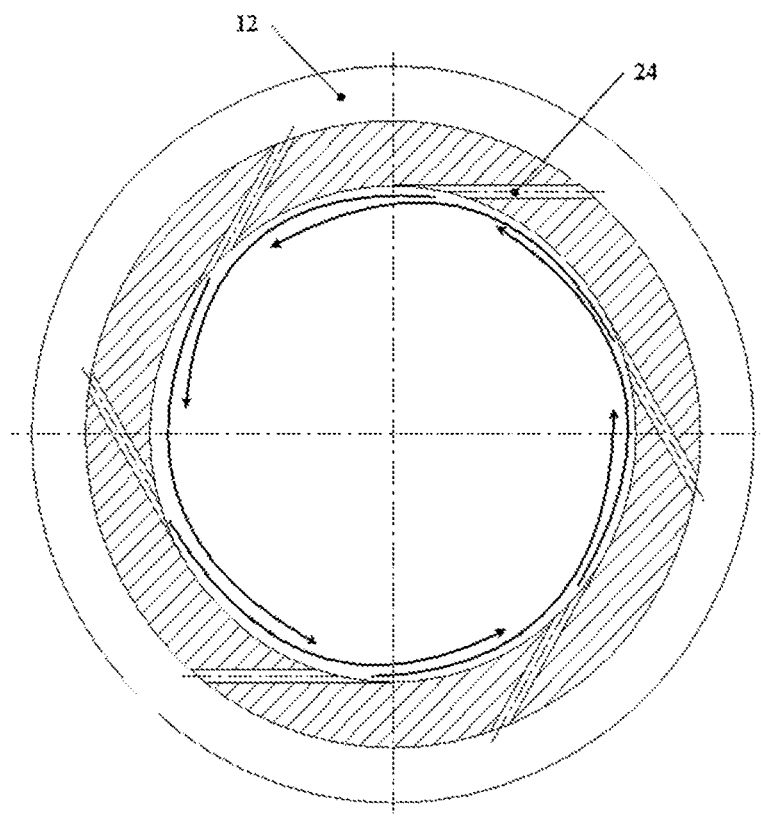
FIG. 5 is a structural diagram of a swirl injector element according to an embodiment of the present disclosure.

Specifically, the swirl injector elements 24 each include multiple, preferably 4-8, third orifices. The multiple third orifices are uniformly arranged along the circumferential direction of the combustion chamber 25, and are oriented in a tangential direction of the circumferential direction of the combustion chamber 25. The third orifices each have a length-diameter ratio of 2-4. Through the design of the swirl injector elements 24, more than 80% of a total fuel flow of the engine is injected tangentially along an inner wall of the thrust chamber 2 to form a uniform film attached to the inner wall for cooling, so as to ensure the thermal structure safety of the thrust chamber 2. As shown in FIG. 5, the multiple swirl injector elements 24 face the combustion chamber 25, and rotate clockwise or counterclockwise to form a swirl flow, so as to fully mix the combustible agent and the combustion improver.

Specifically, the inclined core injector elements 23 are located upstream of a combustion improver flow in the combustion chamber 25. Compared with the inclined core injector elements 23, the swirl injector elements 24 are located downstream of the combustion improver flow in the combustion chamber 25.

Specifically, as shown in FIG. 1, the like-impinging primary injector elements 21 each are provided with vaporization baffle 13 towards the accommodating space. The vaporization baffle 13 is connected with the injector body 1. That is, the injector body 1 is provided with the vaporization baffle 13 at an outlet of the like-impinging primary injector element 21. Liquid oxygen enters the atomization and vaporization chamber 16 through the like-impinging primary injector element 21. Under the guidance of the vaporization baffle 13, a vaporization area of the liquid oxygen is significantly increased after atomization. During a transient ignition process of the engine, the atomized liquid oxygen flashes and vaporizes due to an initial low-pressure environment of the atomization and vaporization chamber 16. After vaporization, gas oxygen passes through the annular secondary injector element 22. The gas oxygen is easier to be broken down and ionized than the liquid oxygen, thus effectively improving the ignition reliability of the engine. During a steady operation process of the engine, in the atomization and vaporization chamber 16, a hot end of the electrode 15 is regenerated to vaporize the atomized liquid oxygen. After vaporization, the gas oxygen forms a uniform oxygen film through the annular secondary injector element 22 to make the downstream combustion more uniform and stable, thus improving the combustion performance of the engine.

Further, two sides of the annular secondary injector element 22 form a high-voltage breakdown circuit of several thousand volts through the electrode 15 and the inner convex cathode 14, and an annular breakdown air gap Le is controlled through the inner convex cathode 14. During the ignition process of the engine, a high-frequency breakdown voltage (typically 100-200 Hz, 2,000 V) is applied through the electrode 15. A continuous breakdown flow passes through the gas oxygen of the annular secondary oxygen injector element 22 to form a pure oxygen plasma flow. The pure oxygen plasma flow enters a mixed zone of the core combustible agent and the combustion improver, namely the combustion chamber 25, to realize the reliable ignition of the engine. This annular breakdown air gap structure facilitates the formation of random multi-point breakdown, and almost simultaneously generates multiple pure oxygen plasma flows, further improving the ignition reliability. During the steady operation process of the engine, the gas oxygen accelerates through the annular secondary injector element 22 to cool a side of the electrode 15, and a pure oxygen swirl zone can be formed on the end surface of the electrode 15 for cooling. Therefore, during the steady operation of the engine, the tip of the electrode 15 is always surrounded by pure oxygen. Combined with the arrangement of the inclined core injector elements 23, the design can effectively prevent the tip of the electrode 15 from overheating and ablation.

The present disclosure solves the problems of poor ignition reliability and poor thermal structure safety of the low-thrust cryogenic engine in the prior art, and the cryogenic engine of the present disclosure can meet the special requirements of tens of thousands of pulse ignition and long service life in the space environment. The present disclosure is applicable to low-thrust liquid oxygen/methane attitude control engines and low-thrust rocket engines based on a cryogenic bi-component non-self-igniting propellant combination such as liquid oxygen/liquid hydrogen or liquid oxygen/kerosene.

In the description of the present application, it needs to be understood the orientation or positional relationships indicated by the terms "up", "down", "front", "rear", "left", "right", "vertical", "horizontal", "top", "bottom", "inside", "outside", etc. are based on the orientation or positional relationship shown in the accompanying drawings, are merely for facilitating the description of the present application and simplifying the description, rather than indicating or implying that an apparatus or element referred to must have a particular orientation or be constructed and operated in a particular orientation, and therefore will not be interpreted as limiting the present application.

The specific embodiments of the present disclosure are described above. It should be understood that the present disclosure is not limited to the above specific implementations, and a person skilled in the art can make various variations or modifications within the scope of the claims without affecting the essence of the present disclosure. The embodiments in the present disclosure and features in the embodiments may be freely combined with each other in a non-conflicting manner.

What is claimed is:

1. A cryogenic engine for a space apparatus, comprising an injector body, a thrust chamber, and a spark plug, wherein
   the injector body is provided therein with an accommodating space; and the spark plug is provided on a first side of the injector body, and an electrode extends into the accommodating space, wherein the electrode is provided on the spark plug;
   the thrust chamber is provided on a second side of the injector body and is communicated with the accommodating space;
   the injector body is provided with a combustion improver flow channel and a combustible agent flow channel; and the combustion improver flow channel and the combustible agent flow channel are connected with the accommodating space;
   wherein an inner wall of the injector body is provided with an inner convex cathode;
   the inner convex cathode divides the accommodating space into an atomization and vaporization chamber and a combustion chamber;
   a gap at one end of the electrode along an extension direction is provided in the inner convex cathode, the gap forms an annular secondary injector element;
   the annular secondary injector element communicates the atomization and vaporization chamber with the combustion chamber;
   the combustible agent flow channel extends to first sub-channel and a second sub-channel; the first sub-channel is connected with the accommodating space through an inclined core injector element; and the second sub-channel is connected with the accommodating space through a swirl injector element;
   the inclined core injector element and the swirl injector element are respectively located upstream and downstream of a combustion improver flow in the combustion chamber; and an impingement point along an axis of the electrode is located between the inclined core injector element and the swirl injector element;
   the combustion improver flow channel is connected with the accommodating space through a like-impinging primary injector element;
   the like-impinging primary injector element is provided with a vaporization baffle towards the accommodating space; and
   the vaporization baffle is connected with the injector body and creates a flow path inside a free end at opposite sides of the atomization and vaporization chamber.

2. The cryogenic engine according to claim 1, further comprising a first valve and a second valve, wherein
   the first valve is provided on the combustion improver flow channel, and the second valve is provided on the combustible agent flow channel.

3. The cryogenic engine according to claim 1, wherein the like-impinging primary injector element comprises a plurality of first orifices; each two first orifices of the plurality of first orifices form a like-impinging pair, and there are 2-8 like-impinging pairs; the plurality of first orifices each have a length-diameter ratio of 2-4; and the 2-8 like-impinging pairs each have an impingement angle of 60-90°.

4. The cryogenic engine according to claim 1, wherein the inclined core injector element is connected with the combustion chamber; and an orientation of the inclined core injector element forms an angle of 0-90° with an orientation of the annular secondary injector element.

5. The cryogenic engine according to claim 1, wherein the inclined core injector element comprises a plurality of second orifices; the plurality of second orifices each have a length-diameter ratio of 2-4, and each two adjacent second orifices of the plurality of second orifices have an impingement angle of 60-90°; and a height between an end surface of an extended end of the electrode and the impingement point along the axis of the electrode is 3-5 mm.

6. The cryogenic engine according to claim 1; wherein the swirl injector element comprises a plurality of third orifices; the plurality of third orifices are uniformly arranged along a circumferential direction of the combustion chamber, and the plurality of third orifices are oriented in a tangential direction of the circumferential direction of the combustion chamber; and the plurality of third orifices each have a length-diameter ratio of 2-4.

* * * * *